(12) United States Patent
Pundir et al.

(10) Patent No.: US 10,644,931 B2
(45) Date of Patent: May 5, 2020

(54) EVENT ORDERING FRAMEWORK IN DISTRIBUTED ASYNCHRONOUS SYSTEMS

(71) Applicant: Walmart Apollo, LLC, Bentonville, AR (US)

(72) Inventors: Amit Kumar Pundir, Bengaluru (IN); Vinay Kumar Vakati, Bengaluru (IN); Vivek Kumar, Bangalore (IN); Prem Sangeeth, Bangalore (IN); Nikhil K. Malukani, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/922,166

(22) Filed: Mar. 15, 2018

(65) Prior Publication Data
US 2019/0089575 A1    Mar. 21, 2019

(30) Foreign Application Priority Data

Sep. 15, 2017  (IN) .............................. 201711032738

(51) Int. Cl.
*H04L 12/24*    (2006.01)
*G06F 9/54*     (2006.01)
*G06F 9/46*     (2006.01)

(52) U.S. Cl.
CPC .......... *H04L 41/065* (2013.01); *G06F 9/465* (2013.01); *G06F 9/542* (2013.01); *G06F 9/546* (2013.01); *H04L 41/022* (2013.01); *H04L 41/06* (2013.01); *H04L 41/064* (2013.01); *H04L 41/069* (2013.01); *H04L 41/0686* (2013.01)

(58) Field of Classification Search
CPC ..... H04L 41/065; H04L 41/022; H04L 41/06; H04L 41/069; H04L 41/0686; H04L 41/064; G06F 9/465; G06F 9/542; G06F 9/466

See application file for complete search history.

(56) References Cited

U.S. PATENT DOCUMENTS

2007/0083569 A1    4/2007  Wong et al.
2008/0301175 A1   12/2008  Applebaum et al.
2010/0293235 A1*  11/2010  Cadoret

OTHER PUBLICATIONS

International Search Report and Written Opinion from related International Patent Application No. PCT/US2018/051170 dated Dec. 6, 2018.

* cited by examiner

*Primary Examiner* — Syed A Roni
(74) *Attorney, Agent, or Firm* — McCarter & English, LLP; David R. Burns

(57) ABSTRACT

An event ordering framework for the ordering of out of ordered messages generated by asynchronous events across disparate systems. The system receives a message, creates a common object model based on the message, and applies a dependency model to the message. Utilizing the dependency model, the framework determines if any subsequently expected messages have already arrived and reprocesses all the messages in the sequence in that event. When a dependent message arrives earlier in the sequence than expected the framework stores the messages corresponding object model for later processing.

20 Claims, 8 Drawing Sheets

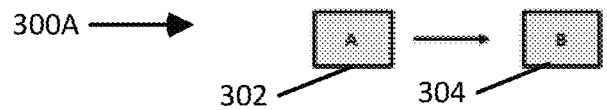
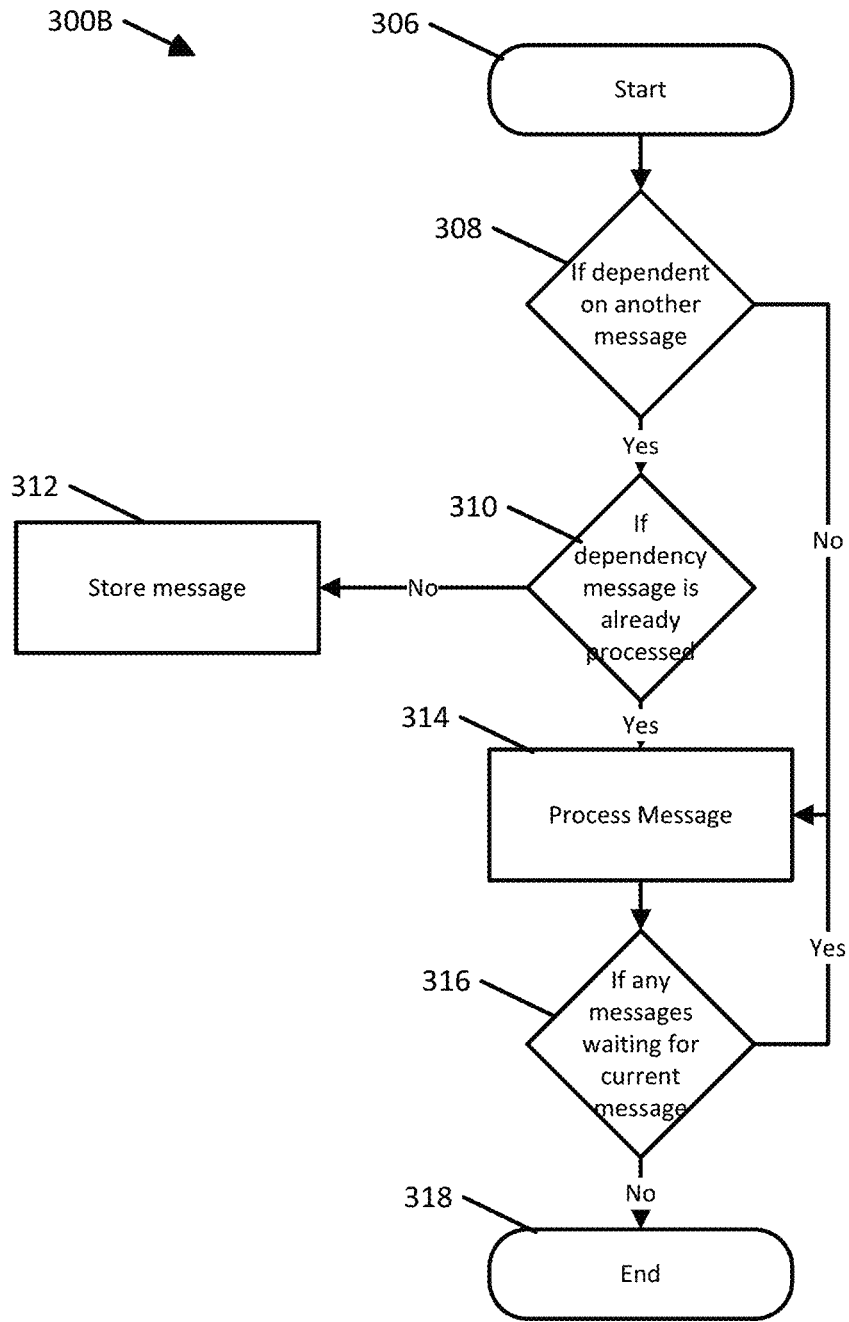
FIG. 3A
FIG. 3B

US 10,644,931 B2

EVENT ORDERING FRAMEWORK IN DISTRIBUTED ASYNCHRONOUS SYSTEMS

RELATED APPLICATIONS

This application claims priority to Indian Patent Application No. 201711032738 entitled "EVENT ORDERING FRAMEWORK IN DISTRIBUTED ASYNCHRONOUS SYSTEMS," filed on Sep. 15, 2017, the content of which is hereby incorporated by reference in its entirety.

BACKGROUND

In information technology deployments, many disparate systems interact for managing operations. Often the systems are developed at different times, for different needs, from different vendors, and are inoperable to communicate in a synchronous manner with one another.

SUMMARY

In accord with embodiments of the present disclosure, an event ordering frameworks are disclosed. Embodiments of the event ordering frameworks can receive, process, and orders message based on asynchronous independent events from disparate computer systems. The event ordering frameworks can create a dependency model for expected messages, convert the received messages into common object models, and order the messages so that the parameters within the messages constitute in-order data transactions.

BRIEF DESCRIPTION OF DRAWINGS

Illustrative embodiments are shown by way of example in the accompanying drawings and should not be considered as a limitation of the present disclosure:

FIG. 3A is a block diagram illustrating a sequence of dependent events according to an exemplary embodiment.

FIG. 3B is a flowchart illustrating a process for ordering a sequence of dependent events according to an exemplary embodiment.

DETAILED DESCRIPTION

Described in detail herein is an event ordering framework. Embodiments of the event ordering framework can provide data structures and functionality for the processing of data transactions which take the form of messaging originating at more than one disparate servers. The messages relating to the transaction may be generated asynchronously by disparate systems and may arrive at a client out of order, thereby providing an inaccurate view of the transaction and potentially causing data inconsistencies or worse. Additionally, because some events may or may not be generated for a given transaction (e.g., optional events), the client may not know whether a particular message (e.g., optional message) will be received, resulting in an efficient use of computing resources including increased transaction processing times, allocation of memory, and processor resources.

To overcome the problems associated with evaluation of messages in distributed asynchronous computing environments, embodiments of the event ordering framework can impose order on those messages to allow the client to provide an accurate view of the transaction and ensure data consistency within the transaction and across different transactions. Each action can take place through disparate systems that have little to no connectivity to one another. A client device receiving notifications of the actions may not be able to resolve the order in which they occurred resulting in inaccurate notification of the state of the order.

Figure 1:
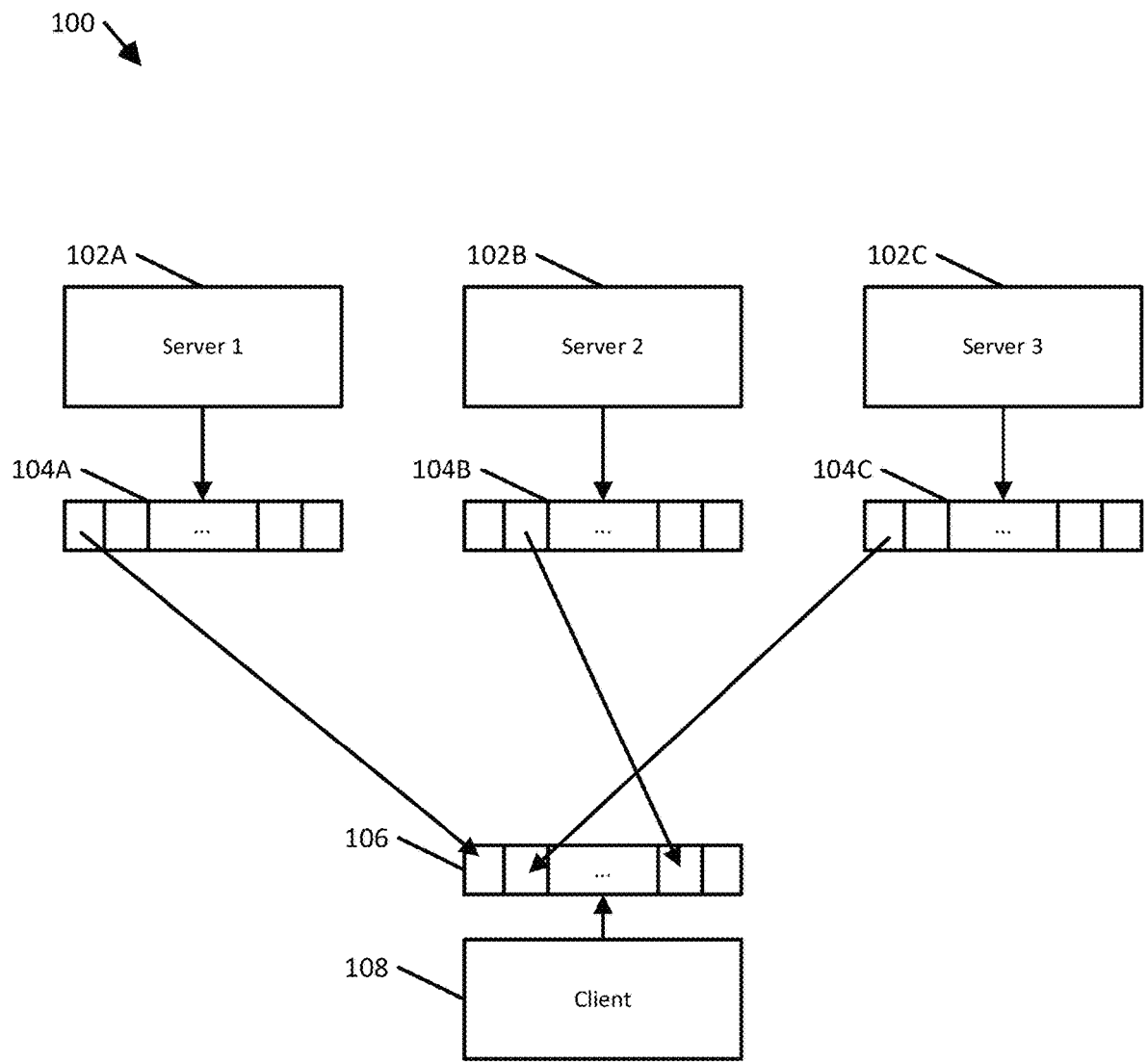
FIG. 1 is a block diagram illustrating a system supporting an event ordering framework according to an exemplary embodiment.

FIG. 1 is a block diagram illustrating a system 100 supporting an event ordering framework according to an exemplary embodiment. The system 100 can include producer servers 102A, 102B, 102C. Coupled to their respective producer servers 102A, 102B, 102C are message queues 104A, 104B, 104C. The message queues are populated by the producer server 102A, 102B, 102C with messages to be delivered to a client 108. The messages can be based on events occurring relative to each of the producer server 102A, 102B, 102C. The events can be independent of events occurring on other producer servers 102A, 102B, 102C and/or can be related to events occurring on other producer servers 102A, 102B, 102C, but can be independently and asynchronously generated by the producer servers 102A, 102B, 102C.

The message queues 104A, 104B, 104C propagate the messages to the client message queue 106, which can be used by the client to extract pertinent information about a transaction that occurred. Information about the transaction can originate at any of the producer servers 102A, 102B, 102C. Because the producer servers 102A, 102B, 102C operate independently and asynchronously from each other, information about the transaction can arrive out of order at the client message queue 106. The client 108 can process the client message queue 108 as the messages arrive, possibly out of order. The client 108 can order the messages utilizing the event ordering framework described herein.

Figure 2A:
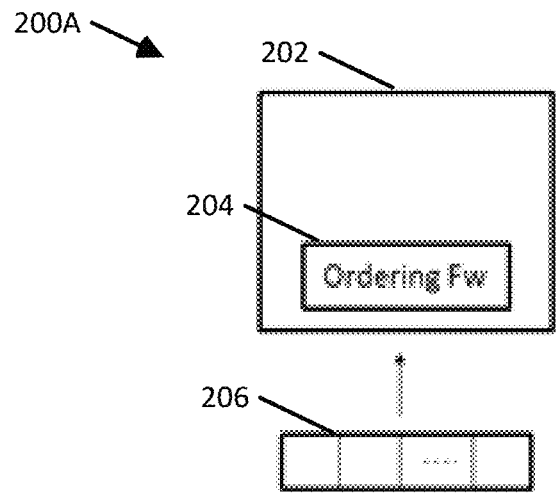
FIGS. 2A and 2B are block diagrams illustrating an event ordering framework according to an exemplary embodiment.
Figure 2B:
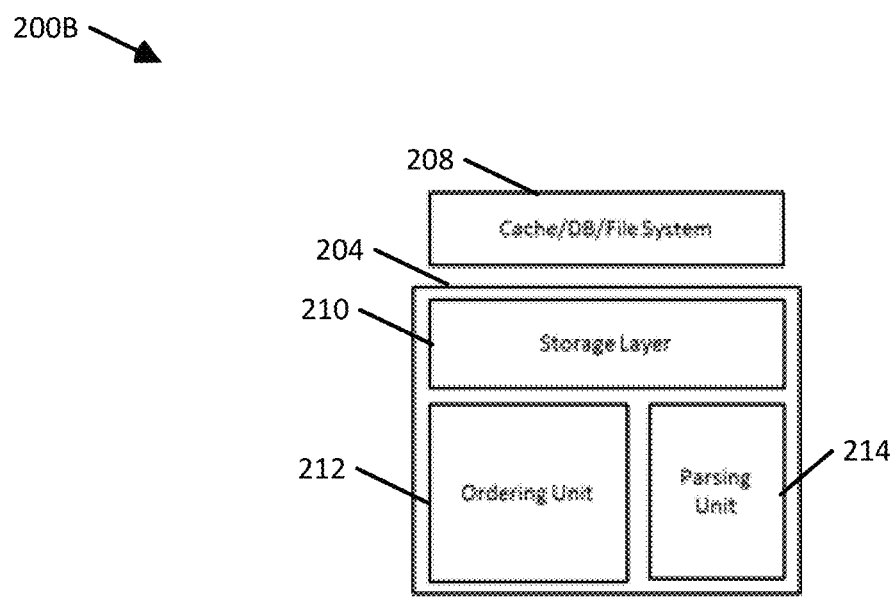

FIGS. 2A and 2B are block diagrams illustrating an event ordering framework according to an exemplary embodiment. FIG. 2A shows a client device 202 in an embodiment of the system 100. The client device 202 can host an ordering framework 204. The client device 202 can be physical hardware-based computer or a virtualized computer implemented with shared hardware components on the host system. In an embodiment, the client device 202 can correspond to the client 108 shown in FIG. 1. The ordering framework 204 can include a dynamically or statically linked library installed on the client device 202. The ordering framework 204 can include publically accessible application programming interfaces, including object oriented data objects and member functions, as well as functional interfaces.

The ordering framework 204 can be communicatively coupled to an input queue 206, which can host messages to be processed by the ordering framework 204. The input queue 206 can take the include one or more of contiguous memory, non-contiguous memory, records in a database table, a first in first out (FIFO) queue, a last in first out (LIFO) queue, a circular buffer, or any other data structure capable of containing a multitude of events or messages. The ordering framework 204 can be operable to access and process the input queue 206.

FIG. 2B is a block diagram 200B illustrating an embodiment of the ordering framework 204. Logically, the ordering framework 204 can include a storage layer 210, an ordering unit 212, and a parsing unit 214. A storage facility 208 can be coupled to the ordering framework 204. Dependency models can be instantiated by the ordering framework 204 to define the data dependency relationship between any received messages. The parsing unit 214 can be implemented to parse dependency models descriptive of expected message sequences. Examples of parsing functionality can include the ability to parse javascript object notation (JSON) files or extensible markup language (XML) files descriptive of the dependency models. The parsing unit 214 can build dependency models based on the parsing and the allocation of system memory of the supporting client device 202 for the dependency model. The dependency models can be shared or passed to the ordering unit 212 for processing the input queue 206. The ordering unit 212 processes messages or events as they arrive from the input queue 206. The ordering unit 212 queries the state of the input queue 206, e.g., by event notification through a listener object, polling or other means for receiving notification that a new message has been placed in the input queue 206. The ordering unit 212 can evaluate the received message by applying methods provided by the dependency model provided by the parsing unit 214.

The ordering unit 212, based on the processing of the received message, can utilize the storage layer 210 to hold the message for further processing or reprocessing. The storage layer 210 can abstract the storage facility 208 utilized for the actual storing of the message. For example, the storage layer 210 can be implemented as an abstract base class in an object oriented language, such as C++. The abstract base class can define a common API for interfacing with the storage facility 208 such as a cache, database, or file system. For each of the cache, database, or file system, a derived class can be utilized inheriting from the abstract base class of the storage layer containing specifics based on the storage facility 208. The appropriate derived class may be instantiated upon execution based on which storage facility 208 is present in the system, while allowing for no implementation changes in the ordering unit 212 based on the storage facility 208 utilized. For atomic operations, the storage layer 210 can include interfaces that implement locking functions for the underlying storage facility 208. While processing messages, the storage layer 210 can render the message inaccessible while one process or thread is operating on the message.

FIG. 3A is a block diagram illustrating a sequence 300A of dependent events according to an exemplary embodiment. The sequence 300A includes a message A 302 and a message B 304. As illustrated, message A 302 has no dependencies in terms of synchronization. Message B 304 has a dependency on message A 302, and therefore should be reprocessed after message A 302 is received. Dependency relationships are articulated in Table 1 below.

TABLE 1

| Message | DependsON |
|---------|-----------|
| A | — |
| B | A |

FIG. 3B is a flowchart illustrating a process 300B for ordering a sequence of dependent events according to an exemplary embodiment.

At step 306, a message from one of the producer servers is received by the client message queue. The message can correspond to an event that occurs at one of the producer servers. The message can be received through conventional networking transport infrastructure, including network sockets at the client device 202. Upon receipt of the message, and prior to processing, the message can be stored, via the storage facility 208, in a message queue. At step 308, the process as performed by the client device determines if the received message is dependent on another message. The dependency can be similar the relationship described in Table 1. A dependency model enforces the dependency relationship and supports the flowchart 300B.

If the message is dependent on another message, the process executed at the client device 202 determines whether the dependent message has already been processed at step 310. The determination can include searching a list of dependency models to identify a prior processed message in the sequence. The search can key off an identifier including but not limited to a sequence number associated with the messages, or a transaction ID associated with the sequence of messages.

If the dependent message has not already been processed, the received message is stored as shown in step 312. The storing can include utilizing the storage layer 210 to interface with the storage facility 208 shown in FIG. 2B. The received message can be stored in a preexisting dependency model instantiated in storage facility 208, or a new dependency model may be instantiated for the storage of the received message.

If dependent messages of the received message have already been processed, the received message can then be processed, as shown at step 314. Additionally, any independent/non-dependent received messages from step 308 may be processed as well. Processing can include utilizing methods or members of the dependency model to manipulate parameters of the received and dependent messages. The manipulation may be applying the sequence to the parameters in updating fields as to arrive at value that represents the cumulative effect of a series of transactions in order.

If any messages currently stored messages are waiting for the received message, as shown at step 316, the stored messages can be processed by the client device 202 subsequently to the processing of the received messages at step 314. If there are no messages stored or waiting for the current message, the process ends at step 318. An example of this process in an order fulfillment system, a store manager can dispense a customer order, message A 302 from a store system while the customer can cancel the order, message B 304, through the customer application. If received and processed out of order, these two events can cause unexpected results as presented in a completed transaction to a client device.

Figure 4A:
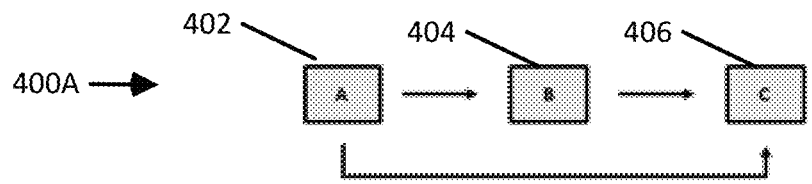
FIG. 4A is a block diagram illustrating a sequence of dependent events with an optional event according to an exemplary embodiment.

FIG. 4A is a block diagram 400A illustrating a sequence of events with an optional event according to an exemplary embodiment. The block diagram 400A includes a message A 402, an optional message B 404, and a message C 406. As illustrated, message A 402 has no dependencies in terms of synchronization. Message B 404 has a dependency on message A 402 and therefore should be reprocessed if message A 302 is received after message B 404. Message C 406 has a dependency on message A 402 and message B 404, and therefore should be reprocessed when message A 402 is received. Dependency and reprocessing relationships are articulated in Table 2 below.

TABLE 2

| Message | DependsON | Reprocess |
|---------|-----------|-----------|
| A       | —         | —         |
| B       | A         | C         |
| C       | B, A      | —         |

Figure 4B:
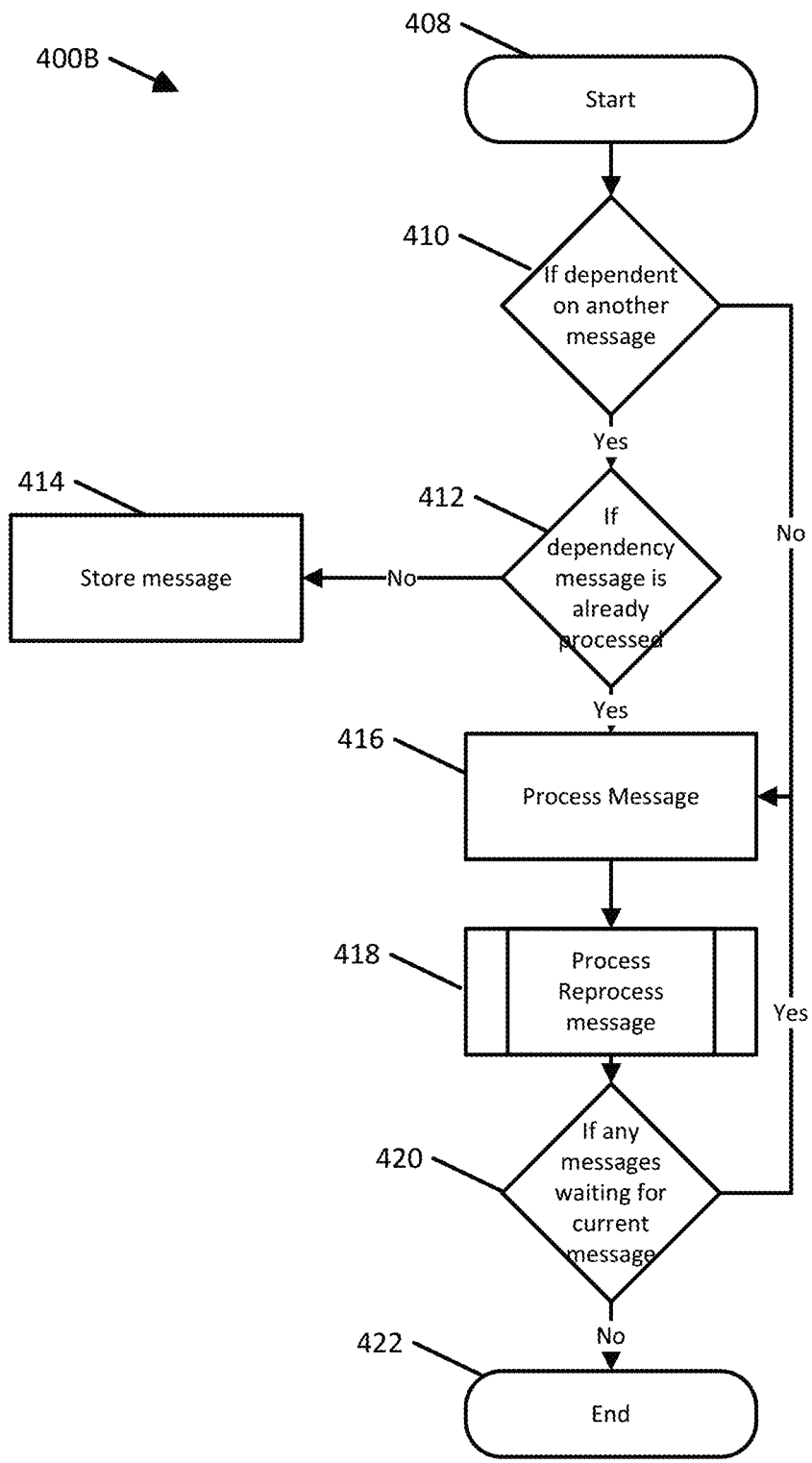
FIG. 4B is a flowchart illustrating a process for ordering a sequence dependent events with an optional event according to an exemplary embodiment.

FIG. 4B is a flowchart illustrating a process for ordering a sequence dependent events with an optional event according to an exemplary embodiment.

The flowchart starts at step 408 with the receiving of a message. Similar to FIG. 3B, the message can correspond to an event that occurs at one of the producer servers and upon receipt of the message at the client device 202, and prior to processing, the message can be stored, via the storage facility 208, in a message queue. At step 410, the process as performed by the client device 202 determines if the received message is dependent on another message. The dependency can be similar the relationship described in Table 2. A dependency model enforces the dependency relationship and supports the flowchart 400B.

If the message is dependent on another message, the process determines whether the dependent message has already been processed at step 412. The determination can include searching a list of dependency models to identify a prior processed message in the sequence. The search can key off a identifier including but not limited to sequence number associated with the messages, or a transaction ID associated with the sequence of messages.

If the dependent message has not already been processed, the received message is stored as shown in step 414. The storing can include utilizing the storage layer 210 to interface with the storage mechanism 208. The received message can be stored in an preexisting dependency model in storage, or a new dependency model may be instantiated for the storage of the received message.

If dependent messages of the received message have already been processed, the received message can then be processed, as shown at step 416. Additionally, any independent/non-dependent received messages from step 410 may be processed as well. Processing can include utilizing methods or members of the dependency model to manipulate parameters of the received and dependent messages. The manipulation may be applying the sequence to the parameters in updating fields as to arrive at value that represents the cumulative effect of a series of transactions in order.

At step 418, any messages needed to be reprocessed can be reprocessed. The reprocessing can include stepping through the dependency model to reprocess any previously received but subsequently sequenced messages in the dependency model. The reprocessing updates the current state of any common parameters throughout the dependency model in order to maintain integrity of any data received in the messages as well as consistency across transactions.

If any messages currently stored messages are waiting for the received message, as shown at step 420, the stored messages can be processed by the client device 202 subsequently to the processing of the received messages at step 416. If there are no messages stored or waiting for the current message, the process ends at step 422.

Figures 5A, 5B:
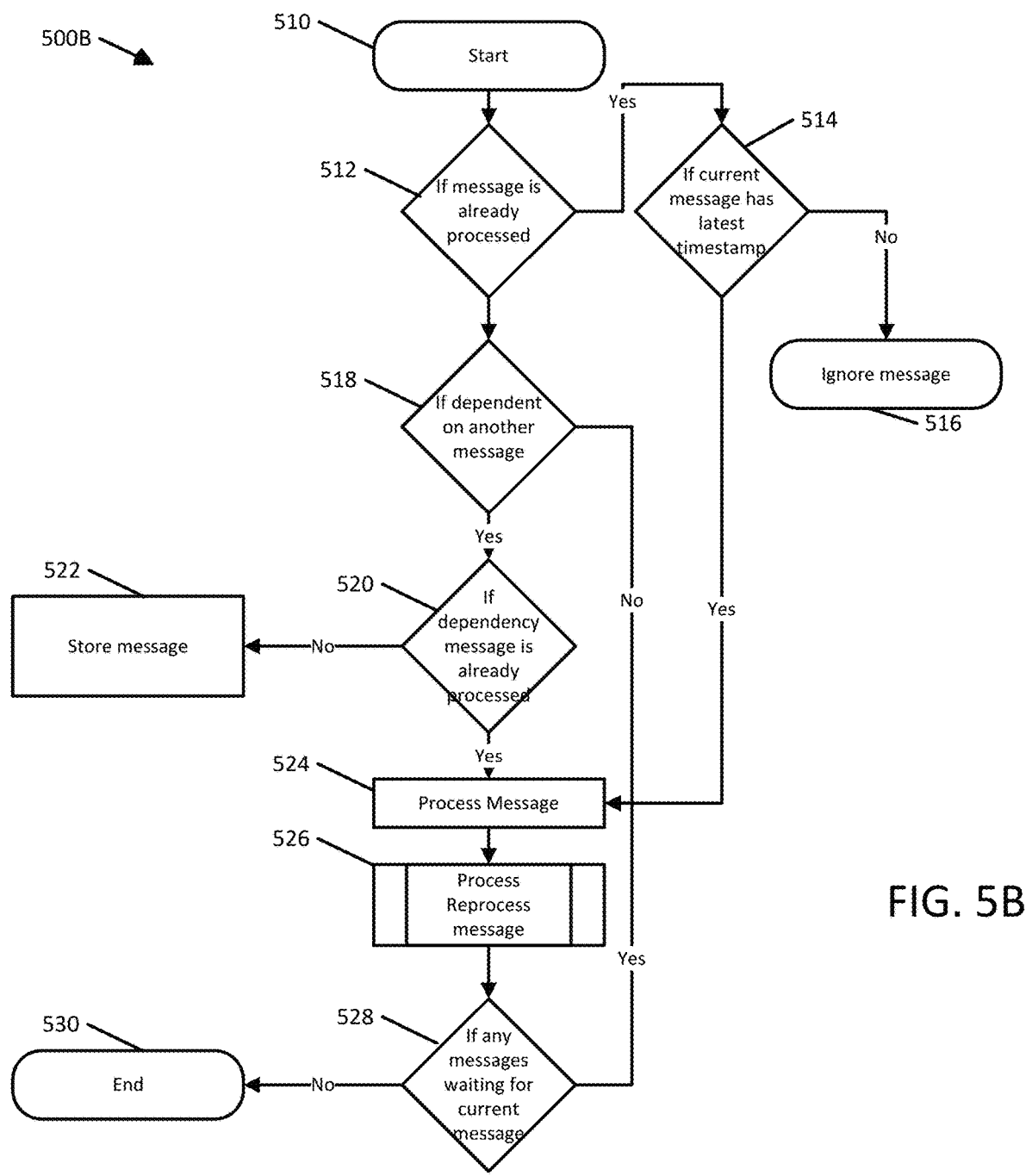
FIG. 5A is a block diagram illustrating a sequence of dependent events with cyclical events an according to an exemplary embodiment.
FIG. 5B is a flowchart illustrating a process for ordering a sequence dependent events with cyclical events according to an exemplary embodiment.

FIG. 5A is a block diagram illustrating a sequence of dependent events with cyclical events an according to an exemplary embodiment. The block diagram 500A includes a message A 502, cyclical message B 504 and cyclical message C 506, and message D 508. As illustrated, message A 502 has no dependencies in terms of synchronization. Message B 404 has a dependency on message A 402 and therefore should be reprocessed if message A 302 is received after message B 404. Message C 406 has a dependency on message A 402 and message B 404, and therefore should be reprocessed when message A 402 is received. Dependency and reprocessing relationships are articulated in Table 2 below.

TABLE 3

| Message | DependsON | Reprocess |
|---------|-----------|-----------|
| A       | —         | —         |
| B       | A, C      | —         |
| C       | B         | —         |
| D       | C         | —         |

FIG. 5B is a flowchart illustrating a process for ordering a sequence dependent events with cyclical events according to an exemplary embodiment.

The flowchart starts at step 510 with the receiving of a message. Similar to FIGS. 3B and 4B, the message can correspond to an event that occurs at one of the producer servers and upon receipt of the message at the client device 202, and prior to processing, the message can be stored, via the storage facility 208, in a message queue. At step 512, the process as performed by the client device 202 determines if the received message has already been processed. The determining may include examining the dependency model as described in Table 3 to evaluate if the received message is of a type already existing or instantiated in the dependency model. The functionality to access the dependency model can be presented as an interface into the ordering framework 204.

If the received message has already been processed, as shown at step 514, the client device 202 determines if the received message has the latest timestamp. The timestamp can be used to determine which of the messages was processed most recently. If the received message does not have the latest time stamp, the received message can be ignored as shown in step 516.

At step 518, the client device 202 determines if the received message is dependent on another message. The dependency can be similar the relationship described in Table 3. A dependency model enforces the dependency relationship and supports the flowchart 500B. Likewise to prior steps, the ordering framework 204 provides an interface to determine dependencies that exist in the dependency model and whether those messages have been received.

If the received message is dependent on another message, the client device 202 determines if the dependent message has already been processed at step 520. The determination can include searching a list of dependency models to identify a prior processed message in the sequence. The search can key off a identifier including but not limited to sequence number associated with the messages, or a transaction ID associated with the sequence of messages.

If the dependent message is not already processed prior, then the received message is stored as shown in step 522. The storing can include utilizing the storage layer 210 to interface with the storage mechanism 208. The received message can be stored in an preexisting dependency model in storage, or a new dependency model may be instantiated for the storage of the received message.

If dependent messages of the received message have already been processed, the received message can then be processed, as shown at step 524. Additionally, any independent/non-dependent received messages from step 518 as well as any most recent timestamped received messages from step 514 may be processed as well. Processing can include utilizing methods or members of the dependency model to manipulate parameters of the received and dependent messages. The manipulation may be applying the sequence to the parameters in updating fields as to arrive at a value that represents the cumulative effect of a series of transactions in order.

At step 526, any messages needed to be reprocessed can be reprocessed. The reprocessing can include stepping through the dependency model to reprocess any previously received but subsequently sequenced messages in the dependency model. The reprocessing updates the current state of any common parameters throughout the dependency model in order to maintain integrity of any data received in the messages.

If any messages currently stored messages are waiting for the received message, as shown at step 528, the stored messages can be processed by the client device 202 subsequently to the processing of the received messages at step 518. If there are no messages stored or waiting for the current message, the process ends at step 530.

Figure 6:
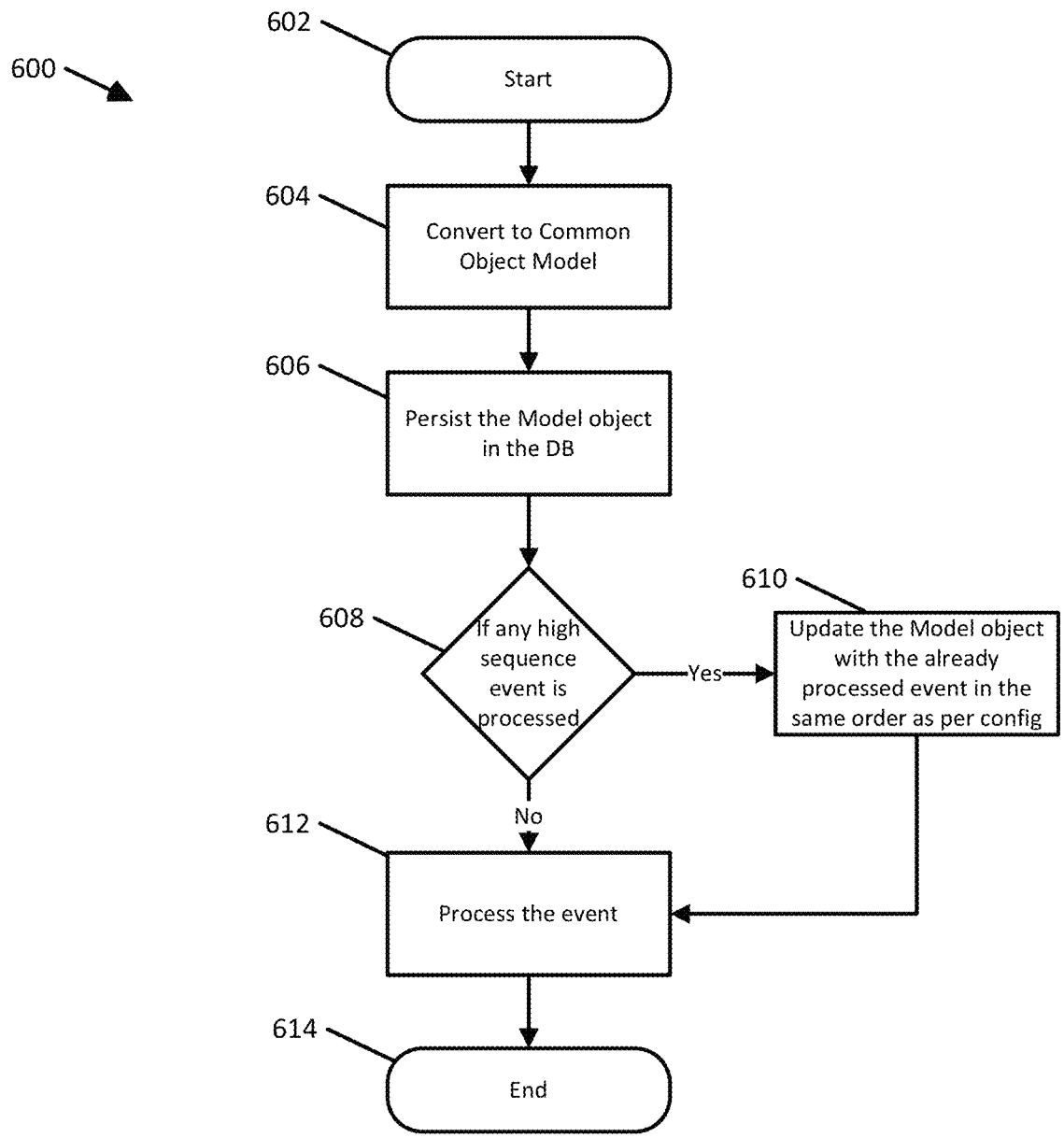
FIG. 6 is a flowchart illustrating a process for applying a common dependency model to an event according to an exemplary embodiment.

FIG. 6 is a flowchart illustrating a process 600 for applying a common object model to an event or message according to an exemplary embodiment. The process starts at step 602.

The process as performed by the client device converts messages into a common object model at step 604. Similar to FIGS. 3B, 4B and 5B, the message can correspond to an event that occurs at one of the producer servers and upon receipt of the message at the client device 202, and prior to processing, the message can be stored in a message queue. The common object model can be stored into memory, which in turn can also be stored to non-volatile storage. The common object model relates to the dependency model, in that it is the data structure representing the message itself and the sequence in which each of the corresponding models are instantiated. Table 4 below is representative of a common model approach for block diagram 400A.

TABLE 4

| Message | Sequence | ModelBuilder |
|---------|----------|--------------|
| A | 1 | BuilderA |
| B | 2 | BuilderB |
| C | 3 | BuilderC |

Once the message is converted into a common object model, the common object model then can persist in a database or storage facility 208 at step 606. The common object model would then be accessible in the storage facility 208 through the storage layer 210, and operated on by the ordering unit 212.

The process then can determine if any high sequenced event is processed at step 608. The sequencing, as represented in the middle column of Table 4, is indicative of the expected order of the message. If a high sequenced message was received, the common object model can be updated with the already processed event in the same order as per the configuration or dependency model as shown at step 610, At step 612, where the message is not a high sequenced event (eg. an independent event), the event can be processed with no additional processing of common object models. Likewise, if the common object model of the high sequence event has already been updated, as shown in step 610, then that event can then be processed. Once the common object model corresponding to the received message or event has occurred, the process ends at step 614.

Figure 7:
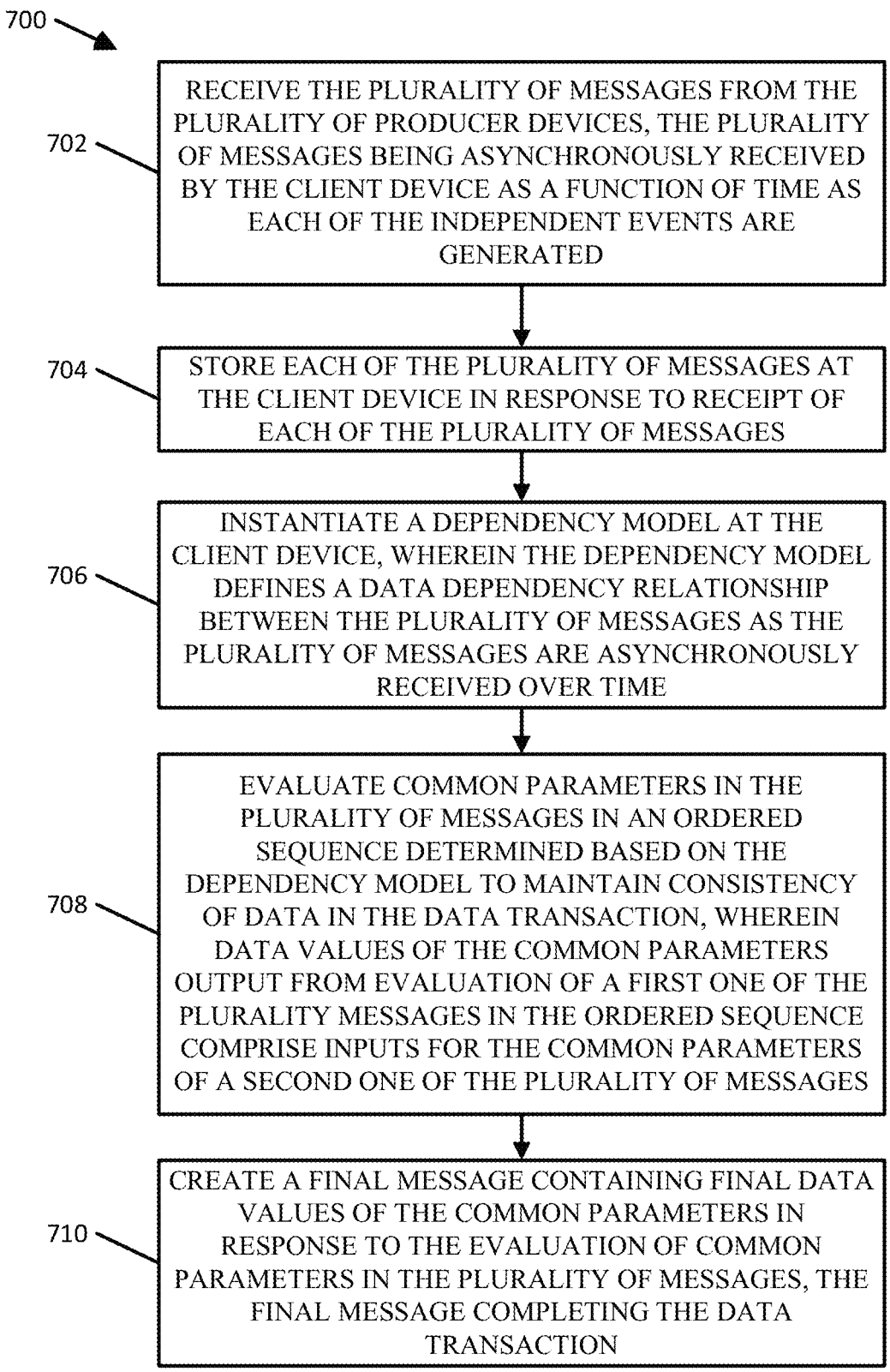
FIG. 7 is a flowchart illustrating a process ordering a sequence of events according to an exemplary embodiment.

FIG. 7 is a flowchart illustrating a process ordering a sequence of events according to an exemplary embodiment. At step 702, messages can be received from producer devices. Producer devices can include disparate systems not originally intended to synchronously communicate with one another or with the client directly. The plurality of messages can be asynchronously received by a client device over time as each of the independent events are generated.

At step 704, each of the plurality of messages are stored at the client device upon receipt. The storing can be facilitated by the storage layer 210 of the ordering framework 204.

At step 706, a dependency model can be instantiated by the client device. The dependency model defines a data dependency relationship between the received messages, which are asynchronously received over time. In one embodiment, the data dependency relationship can correspond to the common object model as described above.

At step 708, the received messages in an ordered sequence, as defined by the dependency model, can be evaluated to maintain consistency of data in the data transaction. Data values existing within the common parameters can be output from the evaluation of an earlier processed message and can become inputs for the common parameters of a later processed messages. The translation of output to input allows for the transactional values existing in the whole of the data sequence to maintain their intended applicability to final data values.

At step 710, a final message can be created containing final data values of the common parameters in response to the evaluation of common parameters in the received messages. The final message can be an embodiment of the completion of the data transaction. The final message can then be presented to a user. In one embodiment, the final message may be rendered on the display of a user device.

Figure 8:
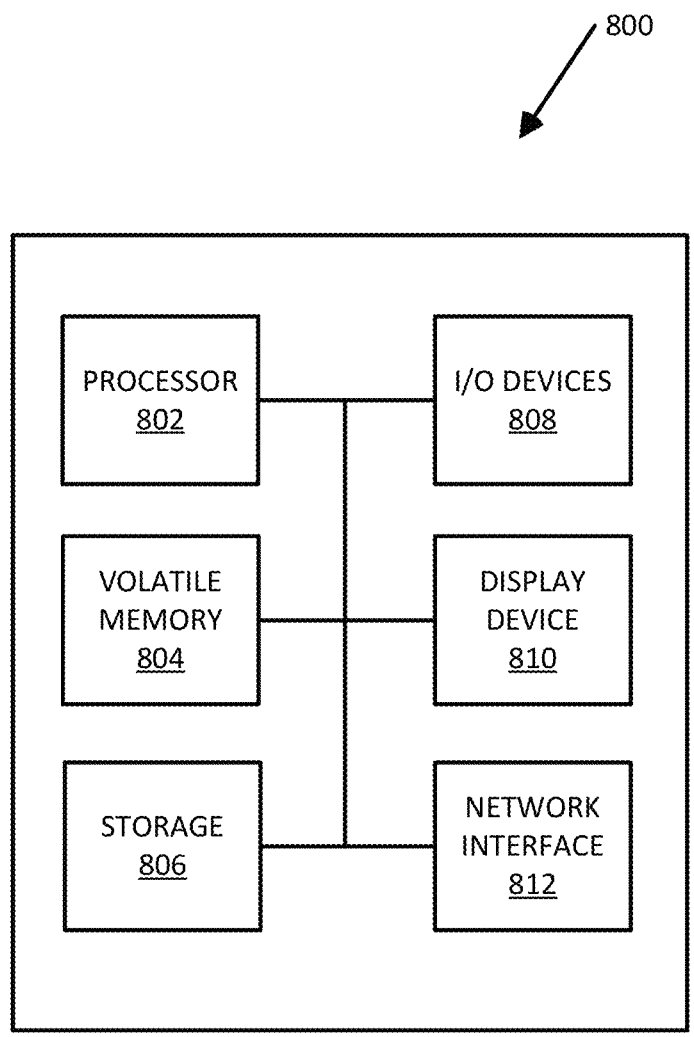
FIG. 8 is a block diagram illustrating an electronic device operable to support an event ordering framework according to an exemplary embodiment.

FIG. 8 is a block diagram illustrating an electronic device operable to support an event ordering framework according to an exemplary embodiment.

Computing device 800 can execute the ordering framework. The computing device 800 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, volatile memory 804 included in the computing device 800 can store computer-readable and computer-executable instructions or software for implementing exemplary operations of the computing device 800. The computing device 800 also includes configurable and/or programmable processor 802 for executing computer-readable and computer-executable instructions or software stored in the volatile memory 804 and other programs for implementing exemplary embodiments of the present disclosure. Processor 802 can be a single core processor or a multiple core processor. Processor 802 can be configured to execute one or more of the instructions described in connection with computing device 800.

Volatile memory 804 can include a computer system memory or random access memory, such as DRAM, SRAM, EDO RAM, and the like. Volatile memory 804 can include other types of memory as well, or combinations thereof.

A user can interact with the computing device 800 through a display 810, such as a computer monitor, which can display one or more graphical user interfaces supplemented by I/O devices 808, which can include a multi-touch interface, a pointing device, an image capturing device and a reader.

The computing device 800 can also include storage 806, such as a hard-drive, CD-ROM, or other computer-readable media, for storing data and computer-readable instructions and/or software that implement exemplary embodiments of the present disclosure (e.g., applications). For example, storage 806 utilized in the ordering framework 204 can include one or more storage facilities 208 for storing information associated with product pricing information and product packaging information and can be indexed accordingly. The storage facilities 208 can be updated manually or automatically at any suitable time to add, delete, and/or update one or more data items in the databases.

The computing device 800 can include a network interface 812 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 812 can include one or more antennas to facilitate wireless communication between the computing device 800 and a network and/or between the computing device 800 and other computing devices. The network interface 812 can include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components, or steps can be replaced with a single element, component, or step. Likewise, a single element, component, or step can be replaced with multiple elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further, still, other aspects, functions, and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

We claim:

1. A system for ordered evaluation of a sequence of messages in a distributed asynchronous computing environment, the system comprising:

a plurality of producer devices, wherein the plurality of producer devices comprise a set of disparate systems configured to generate a plurality of messages based on independent events associated with data transactions;

a client device communicatively coupled to the plurality of producer devices;

a framework module that when executed on the client device causes the client device to:

receive the plurality of messages from the plurality of producer devices, the plurality of messages being asynchronously received by the client device as a function of time as each of the independent events are generated;

store each of the plurality of messages at the client device in response to receipt of each of the plurality of messages;

instantiate a dependency model at the client device, wherein the dependency model defines a data dependency relationship between the plurality of messages as the plurality of messages are asynchronously received over time;

evaluate the plurality of messages as the message are received over time;

determine that a previously received one of the plurality of messages that has been evaluated is dependent of a subsequently received one of the plurality of messages that has not been evaluated, the previously received one of the plurality of messages and the subsequently received one of the plurality of messages including a common parameter;

evaluate the subsequently received one of the plurality of messages;

re-evaluate the common parameter in the previously received one of the plurality of messages based on evaluation of the subsequently received one of the plurality of messages and the dependency model to maintain consistency of data in the data transaction, a data value of the common parameter output from evaluating the subsequently received one of the plurality of message being used as an input for evaluation of the data value of the common parameter in the previously received one of the plurality of messages to update or change the data value;

create a final message containing final data values of the common parameter in response to the re-evaluation of the common parameter in the plurality of messages, the final message completing the data transaction; and send the final message to a display device.

2. The system of claim 1, the framework module causing the client device to instantiate a dependency model comprising:

parse a dependency model configuration file, and
build the dependency model based on a plurality of characteristics extracted in the parsing.

3. The system of claim 1, the framework module causing the client device to evaluate further comprising:
determine a parameter in common between the plurality of messages, and
update the parameter in a subsequently evaluated message in the plurality of messages at the client device.

4. The system of claim 1, the framework module further comprising:
receive an additional message from the plurality of producer devices at the client device,
include the additional message with the plurality of messages;
order the plurality of messages based on the dependency model,
update the plurality of messages based on the ordering at the client device,
reevaluate the common parameter associated in the plurality of messages, wherein a parameter in common between messages in the plurality of messages is updated by subsequently evaluated messages in plurality of messages at the client device,
update the final message containing final data values of the common parameter in response to the reevaluation, and
send the final message to a display device.

5. The system of claim 4 wherein the data dependency relationship comprises a plurality of required messages and a plurality of optional messages.

6. The system of claim 4, wherein the data dependency relationship comprises a cyclical message sequence.

7. The system of claim 4, wherein the data dependency relationship comprises a plurality of required messages and a plurality of unrelated message.

8. A method ordered evaluation of a sequence of messages in a distributed asynchronous computing environment, the method comprising:
receiving a plurality of messages at a client device from a plurality of producer devices, wherein the plurality of producer devices comprise a set of disparate systems configured to generate a plurality of messages based on events associated with data transactions, the plurality of messages being asynchronously received by the client device as a function of time as each independent event is generated;
storing each of the plurality of messages at the client device in response to receipt of each of the plurality of messages;
instantiating a dependency model at the client device, wherein the dependency model defines a data dependency relationship between the plurality of messages as the plurality of messages are asynchronously received over time;
evaluating the plurality of messages as the message are received over time;
determining that a previously received one of the plurality of messages that has been evaluated is dependent of a subsequently received one of the plurality of messages that has not been evaluated, the previously received one of the plurality of messages and the subsequently received one of the plurality of messages including common parameter;
evaluating the subsequently received one of the plurality of messages;
re-evaluating the common parameter in the previously received one of the plurality of messages based on evaluation of the subsequently received one of the plurality of messages and the dependency model to maintain consistency of data in the data transaction a data value of the common parameter output from evaluating the subsequently received one of the plurality of message being used as an input for evaluation of the data value of the common parameter in the previously received one of the plurality of messages to update or change the data value;
creating a final message containing final data values of the common parameter in response to the re-evaluation of the common parameter in the plurality of messages, the final message completing the data transaction; and
sending the final message to a display device.

9. The method of claim 8, the instantiating comprising:
parsing a dependency model configuration file; and
building the dependency model based on a plurality of characteristics extracted in the parsing.

10. The method of claim 8, further comprising:
determining a parameter in common between the plurality of messages; and
updating the parameter in a subsequently evaluated message in the plurality of messages at the client device.

11. The method of claim 8, further comprising:
receiving an additional message from the plurality of producer devices at the client device;
including the additional message with the plurality of messages;
ordering the plurality of messages based on the dependency model;
updating the plurality of messages based on the ordering at the client device;
reevaluating the common parameter associated with the plurality of messages, wherein a parameter in common between messages in the plurality of messages is updated by subsequently evaluated messages in the ordered list at the client device;
updating the final message containing final data values of the common parameter in response to the reevaluation; and
sending the final message to a display device.

12. The method of claim 11, wherein the data dependency relationship comprises a plurality of required messages and a plurality of optional messages.

13. The method of claim 11, wherein the data dependency relationship comprises a cyclical message sequence.

14. The method of claim 11, wherein the data dependency relationship comprises a plurality of required messages and a plurality of unrelated message.

15. A non-transitory computer readable medium for ordered evaluation of a sequence of messages in an distributed asynchronous computing environment, having stored thereon, instructions that when executed by a computing device, cause the computing device to perform operations comprising:
receive a plurality of messages at a client device from a plurality of producer devices, wherein the plurality of producer devices comprise a set of disparate systems configured to generate a plurality of messages based on events associated with data transactions, the plurality of messages being asynchronously received by the client device as a function of time as each independent event is generated;

store each of the plurality of messages at the client device in response to receipt of each of the plurality of messages;

instantiate a dependency model at the client device, wherein the dependency model defines a data dependency relationship between the plurality of messages as the plurality of messages are asynchronously received over time;

evaluate the plurality of messages as the message are received over time;

determine that a previously received one of the plurality of messages that has been evaluated is dependent of a subsequently received one of the plurality of messages that has not been evaluated, the previously received one of the plurality of messages and the subsequently received one of the plurality of messages including common parameter;

evaluate the subsequently received one of the plurality of messages;

re-evaluate the common parameter in the previously received one of the plurality of messages based on evaluation of the subsequently received one of the plurality of messages and the dependency model to maintain consistency of data in the data transaction a data value of the common parameter output from evaluating the subsequently received one of the plurality of message being used as an input for evaluation of the data value of the common parameter in the previously received one of the plurality of messages to update or change the data value;

create a final message containing final data values of the common parameter in response to the re-evaluation of the common parameter in the plurality of messages, the final message completing the data transaction; and send the final message to a display device.

16. The computer readable medium of claim 15, the instructions that when executed by a computing device, cause the computing device to perform operations to determine a relationship further comprising:

parse a dependency model configuration file; and build the message dependency model based on a plurality of characteristics extracted in the parsing.

17. The computer readable medium of claim 15, the instructions that when executed by a computing device, cause the computing device to perform operations to evaluate further comprising:

determine the common parameter between the plurality of messages; and update the common parameter in a subsequently evaluated message in the plurality of messages at the client device.

18. The computer readable medium of claim 15, the instructions that when executed by a computing device, cause the computing device to perform operations further comprising:

receive an additional message from the plurality of producer devices at the client device;

include the additional message with the plurality of messages;

order the plurality of messages based on the dependency model;

update the plurality of messages based on the ordering at the client device;

reevaluate the common parameter associated with the plurality of messages, wherein the common parameter between messages in the plurality of messages is updated by subsequently evaluated messages in the ordered list at the client device;

update the final message containing final data values of the common parameter in response to the reevaluation; and send the final message to a display device.

19. The computer readable medium of claim 18, wherein the data dependency relationship comprises a plurality of required messages and a plurality of optional messages.

20. The computer readable medium of claim 18, wherein the data dependency relationship comprises a cyclical message sequence.

* * * * *